Aug. 18, 1931.                R. N. FRIEND                1,819,086
                            TUBULAR STRUCTURE
                         Filed April 13, 1928         3 Sheets-Sheet 1
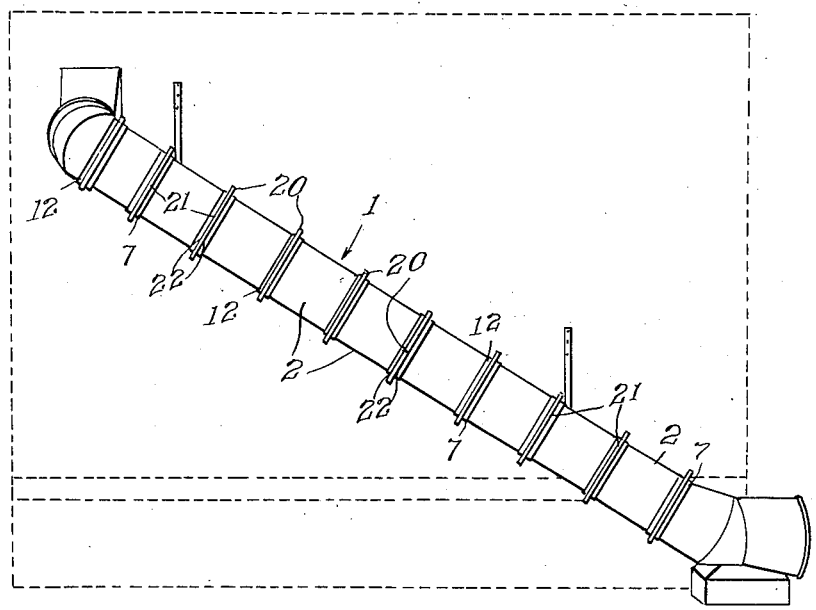
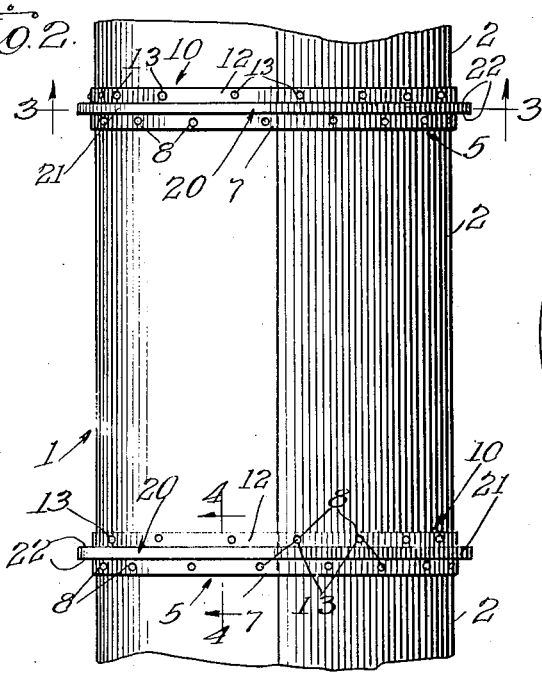
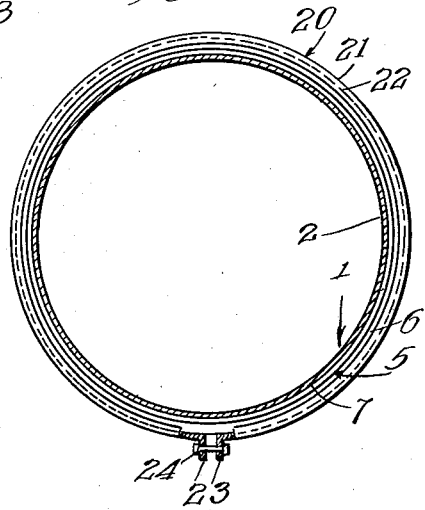
Inventor
Richard Nason Friend Aug. 18, 1931.      R. N. FRIEND      1,819,086
TUBULAR STRUCTURE
Filed April 13, 1928      3 Sheets-Sheet 2
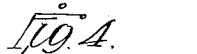
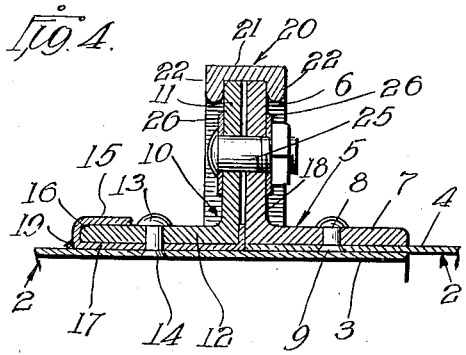
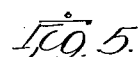
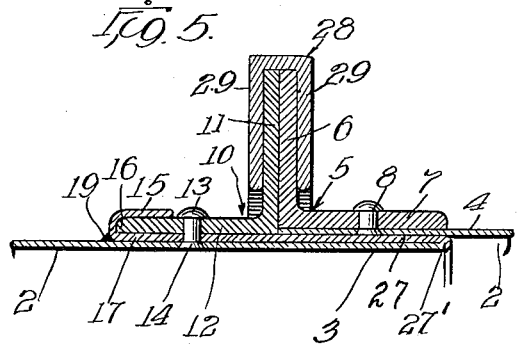
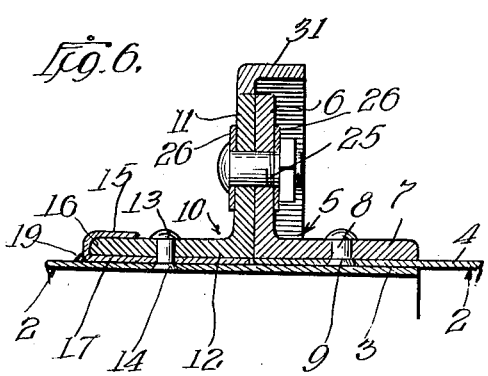
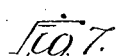
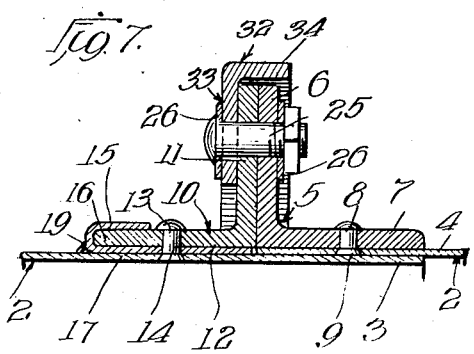
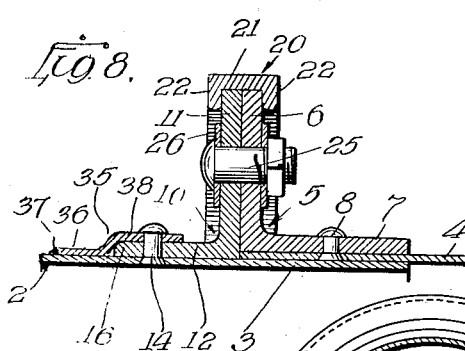
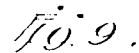
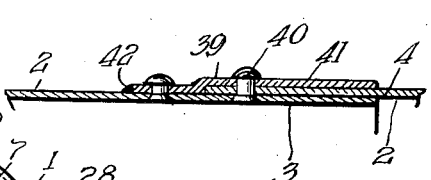

Aug. 18, 1931.     R. N. FRIEND     1,819,086
TUBULAR STRUCTURE
Filed April 13, 1928     3 Sheets-Sheet 3

Patented Aug. 18, 1931

1,819,086

UNITED STATES PATENT OFFICE

RICHARD NASON FRIEND, OF SIOUX CITY, IOWA

TUBULAR STRUCTURE

Application filed April 13, 1928. Serial No. 269,803.

My invention relates to improvements in tubular structures and has especial reference to improvements in the joints of tubular fire escapes.

The object of my invention is to provide a joint for this purpose which shall be water-tight when the tube is vertical or inclined at a substantial angle to the horizontal, and which shall be capable of being produced in the factory or shop and shipped to the place of erection without any great possibility of damage in transportation.

Such fire escapes are produced in tubular sections which are shipped to the place of erection and are then secured end to end in erecting the fire escape.

The walls of these sections are usually made of heavy galvanized iron sheets and the ends are provided with angle iron reinforcing ring flanges which are adapted to be bolted together in building the fire escape. As in the use of such a fire escape, the one using it slides down the tube, the lower ends of the sections telescope into the upper ends of the next lower sections in order to avoid edges which would be objectionable for such use.

While the angle iron flanges are tightly riveted in place, being made of black iron, they do not lend themselves to the production of water-tight joints and the consequence is that water leaks into the tubes between the flanges and the angle irons, not only rusting out the connections but causing dampness in the tubes with the accumulation of dust, dirt and rust, all of which is very objectionable, especially when these fire escapes are used on schools and the children are frequently put through fire drills without the tubes being cleaned.

My invention resides in a joint which has the sheet metal of the lower ends of the sections so formed that water running down the outside of the tube cannot leak through into the tube, the joint either being sealed against the entrance of water between the members which form the joint or the joint so constructed that if water does enter between the members of the joint it is effectively prevented from entering the tube.

One form of the invention includes the turning back of the lower ends of the sheet metal sections upon themselves and the outward flanging of this turned back end to form a water seal or the addition of a separate sheet metal ring member projecting beneath the turned back end and flanged out at its other end to form a water seal.

An important feature of my invention is the provision of a member adapted to overlap the upper edge of the uppermost of the connecting angle iron rings to shed water over such edge and which overlapping water shedding member shall be capable of being effectively joined to the lower end of the tubular section in a water-tight and permanent condition, such as by being soldered thereto.

Another point which is included in my invention of a water-tight joint is that of covering the joint between the two angle iron flanges, of a joint, so that water cannot enter between them from the outside.

Another feature relates to means for sealing the bolt holes in the connecting flanges of the angle irons to prevent water entering between the angle iron rings at these points.

By reference to the accompanying drawings forming part of this specification it will be seen that I have worked out the general idea in a number of different specific ways but that all thereof are effective to accomplish the results desired, viz: the production of a water-tight joint of a permanent character for large tubes and which tubes can be shipped in sections without danger of damage to the ends of the sections which form the joints.

My invention will be more readily understood by reference to said drawings and in which:

Fig. 1 is an elevational view of a fire escape constructed in accordance with my invention;

Fig. 2 is a fragmentary, enlarged, side elevation of a portion of the tube;

Fig. 3 is a cross-section of the tube on the line 3—3 of Fig. 2;

Fig. 4 is an enlarged, fragmentary, lon gitudinal section through one of the joints and taken on the line 4—4 of Fig. 2;

Fig. 5 is a view similar to Fig. 4 and showing a slight modification;

Figs. 6, 7, 8 and 9 are views similar to Fig. 4 showing other slight modifications of the invention;

Fig. 10 is a cross-section of the tube particularly illustrating one of the deep connecting rings.

Figure 11:
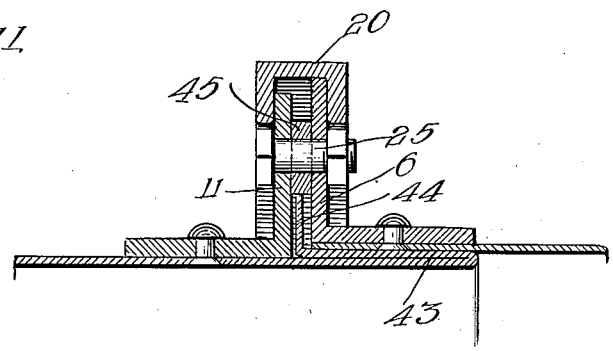
Figs. 11, 12 and 13 are views similar to Fig. 4, showing forms of the invention which are water-tight without the use of solder.

In said drawings 1 illustrates a tubular fire escape down which the ones escaping from the fire can slide from an elevated position to the ground. The fire escape is adapted to be arranged in an inclined position outside of a building and connected at its upper end to an opening in the wall of the building by which access is attained to the fire escape.

The escape, being outside of the building, is exposed to the weather. The tube necessarily being of rather large diameter and of considerable length cannot be shipped and erected in one piece, but has to be made of sections and put together at the place of erection.

My invention has to do with the making of the connections or joints between the tubular sections, water-tight. It should be understood that the practical application of my invention is not limited to use in fire escapes but that it can be beneficially applied in many situations.

As illustrated, the fire escape 1 is made up of a plurality of tubular sections 2. In practice these sections are about 4 or 5 feet long, depending on the width of the sheets which are used to make the sections.

While the several drawings illustrating the construction of the joints between sections are made with the walls of the tube shown as extending horizontally, it should be understood that the joints are designed to be used on a vertical or inclined tube rather than on a horizontal tube.

Referring now to Fig. 4, the lower end 3 of the upper section 2 is shown as entering within the upper end 4 of an adjacent lower section 2. This construction is necessary so that as a person slides down the tube there will not be any edge which will tend to impede his progress.

Preferably the tubular sections 2 are made of galvanized sheet iron, this is for the purpose of assisting in preventing the tube rusting out. Each section has an angle iron connector ring secured at each of its ends. The angle iron ring 5 at the upper end 4 of the section is placed so that the outwardly projecting leg 6 is substantially flush with the end of the section and the inner leg 7 is secured upon the outer surface of the section by rivets 8 having flat or countersunk heads 9 at their inner ends. The angle iron ring 10 secured to the lower end of the section is spaced inwardly from the end of the section to provide a projecting nozzle for entering within the upper end of the next section, as described. This angle iron ring 10 likewise has one leg 11 projecting outwardly and its other leg 12 secured upon the outer surface of the tubular section by rivets 13 with flat or countersunk heads 14 at their inner ends.

These angle iron rings are made of black or ungalvanized iron and the joints which have to be sealed to prevent the leakage of water is that between the two angle iron rings and that between the leg 12 of the ring 10 and the outer surface of the section 2. The leakage of water at these points not only lets water into the main tube where it tends to collect dirt and dust but also it tends to rust out the rivets and the walls of the tube around the rivets and generally causes the rapid deterioration of the tube at the joints.

The angle iron connector rings 5 and 10 being of black or ungalvanized iron cannot be permanently sealed to the tube in any practical manner. It has been tried to seal this joint by various packing materials, paint and cement, but none thereof has proven permanent enough. All either dry out or harden and crack due to weather conditions and the expansion and contraction of the walls of the fire escape, hence this invention.

In order to close the joint between the leg 12, of the angle iron connector 10, and outer surface of the tubular section upon which it is secured, I provide a water shed member having an edge portion, flange or skirt 15, which overlaps the upper edge 16 of said leg and extends downwardly outside of said leg, and I seal the inner or other edge portion of said water shed member to the outer surface of the section 2, preferably by soldering same to the tube all the way around. This water shed member may take different forms, for instance in Fig. 4, this member is shown at 17 as extending between the leg 12 and the tube and having its inner edge 18 bent outwardly and extending between the opposed faces of the two angle iron connecting rings.

This member 17 is tightly held in position by the rivets 13 which pass through it as well as through the wall of the tube and the leg 12, but this does not seal the joint. I make this water shed member preferably of galvanized sheet iron and I permanently seal the joint by soldering this member to the wall of the tube at the place where the water shed member leaves the tube, as shown at 19. As both the contacting surfaces at this point are galvanized, it is a comparatively simple matter to close the joint by solder, as shown.

For closing the joint between the two outwardly opposed legs of the two angle iron rings I may use one of several means. In Fig. 4 I have shown a channel member 20 having a web portion 21 spanning the outer edges of the legs 6 and 11 and the space between them and having edge flanges 22 projecting in inwardly and overlapping the outer edges of the angle legs 6 and 11. This channel member is in the form of a ring and, as indicated in Fig. 3, has bent out ends 23 adapted to be clamped together by a bolt 24 to hold the channel ring in place. The legs 6 and 11 are clamped together to hold the sections of the tube together by bolts 25 and the bolt holes in the flanges 6 and 11 can be made water-tight in any suitable manner, as by means of lead washers 26 beneath the head and nut of the bolt.

In Fig. 5 I have shown another way to produce the water shedding member. In this form the lower edge of the sheet of which the tube section is made is first folded back upon itself as shown at 27 to an extent necessary to provide the nozzle portion 3, and the water shedding flange 15; this bend is shown at 27′, Fig. 5, then the procedure is similar to that already described. While I have shown solder 19 at the juncture of the flange 15 and the tube 2, as described before, the solder is not a necessity in this form. First, for the reason that any water which might seep in between the turned back flange 27 and the tube 2 cannot enter the tube as this is prevented by the sealed end 27′. Second, in making a joint of this kind the contacting surfaces between the turned back part 27 and the tube 2 are painted before the joint is formed and the paint hardens, fills and seals this joint.

In this figure I have also shown another means for sealing the joint between the flanges 6 and 11 of the connecting angle iron rings. In this instance these flanges are brought tight together and I provide a deep channel member 28 having flanges 29 which extend inwardly nearly to the other legs of the angle members. This deep channel does away with the necessity of bolting the angle flanges 6 and 11 together, as they are held tightly together by this deep channel. This channel is preferably made in two parts, as shown in Fig. 10, and the parts are provided with bent out ends 30 adapted to receive bolts 30. The joints between the two parts of the channel ring 28 are preferably placed at the ends of the horizontal diameter of the ring and hence do not tend to admit any water between the flanges 6 and 11.

In Fig. 6 I have shown another means of making the joint between the two flanges 6 and 11 water-tight. This means consists of an over hanging water shedding flange 31 secured to or forming part of the upper flange 11. This flange 31 may be secured by any suitable means such as being welded thereto, or it can be formed on the angle iron in the process of rolling the angle member. In this figure the joint between the leg 12 and the tube is made in the manner described in connection with Fig. 4.

In Fig. 7 I have shown still another means of shedding water past the joint between the flanges 6 and 11. This means consists of a third angle iron member 32 having one leg 33 bolted flat against the upper flange 11 and its other leg 34 projecting past the outer edges of the legs 6 and 11 and spanning the joint between them. This angle iron 32 in most instances need extend but half way around the joint, that is, on the upper half only. In this form and in the form shown in Fig. 6 the joint between the angle member 11 and the tube is sealed by solder at the point 19, as in Fig. 4.

In Fig. 8 I have shown a simple form of my invention, though not so neat in appearance as the form shown in Fig. 4, but having a water shedding or sealing strip 35. In this latter modification the sealing strip does not project beneath the base of the angle iron ring 11 but extends upwardly along the tube, as shown at 36, and the joint between this water shedding member and the tube is sealed by solder at its upper edge, as shown at 37, the opposite edge portion 38 of the member 35 overlaps the base 12 of the angle iron ring 11 and may be riveted in place by the rivets 14 which secure the angle iron ring 12 to the tube. The balance of the joint may be similar to that shown in Fig. 4.

In Fig. 9 I have shown a simple form of joint similar to that shown in Fig. 8 but without the angle iron connection rings. In this form I make use of a water shedding strip 39 similar to the strip 35 shown in Fig. 8 but extending down the tube and ending substantially coincidently with the lower end 3 of the tubular section 2 and spaced outwardly to receive the upper end 4 of the lower tubular section, telescopically between them. In this form the lower section is adapted to be permanently connected or held to the upper section, after being placed in position by rivets 40 passing through the walls of the two sections and through the lower end portion 41 of the water shedding member 39. The joint between the member 39 and the tube is sealed with solder 42 at the upper edge of the strip, as in the form shown in Fig. 8.

Figure 12:
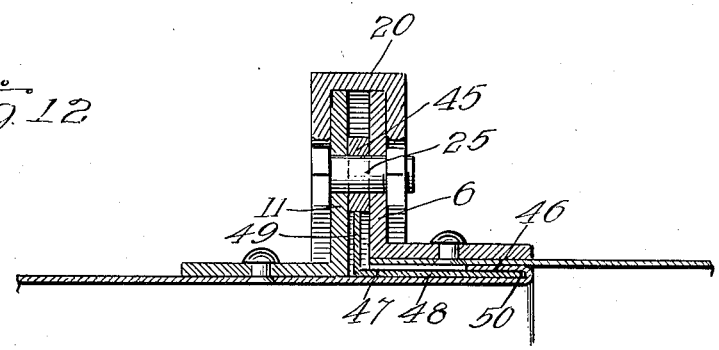
Figure 13:
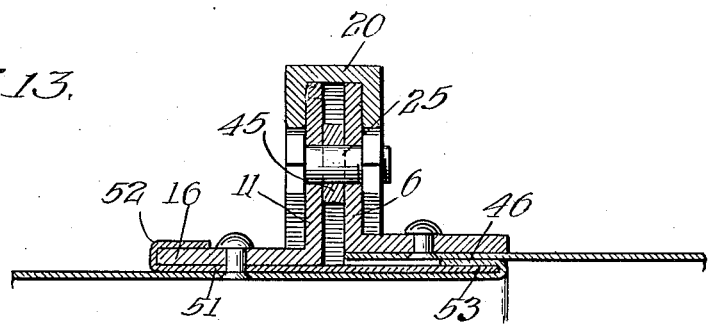

In Figs. 11, 12 and 13, I have shown other forms of the invention which, like the form shown in Fig. 5, do not depend upon solder for making a water-tight joint.

The form shown in Fig. 11 is quite similar to that shown in Fig. 5, except that the turned back lower edge portion 43 instead of extending back far enough to form the water shedding flange 15, Fig. 5, is turned outwardly to provide a water shedding flange 44 which extends out part way between the two angle rings 6 and 11, thus effectively sealing the joint between the nozzle 3 and the upper telescoped end of the lower section 4. In this figure I have shown another way in which the bolt holes in the angle rings can be sealed. This consists in placing a lead washer 45 between the opposed flanges of the angle rings 5 and 10 and around the bolt 25 and then tightening the bolt and drawing the flanges tight upon the washer.

In Fig. 12 I have shown a slight modification of the form shown in Fig. 11. This consists in turning the lower edge of the upper section back, as shown at 46, only a short distance and completing the water shedding member similar to that shown in Fig. 11, by a separate angle ring member 47 having a flange 48 in contact with the outer surface of the tube and an outwardly extending flange 49 which projects out between the angle ring flanges 6 and 11 similar to the flange 44 in Fig. 11. It will be seen that the turned back flange 46 effectually seals the joint between the angle member 47 and the tube 3, and prevents any water getting into the tube unless it should back up over the upper edge 50 of the turned back flange 46. This latter is not likely to happen for as before stated the surfaces are painted before the parts are put together.

In Fig. 13, I have shown a form which is similar to that shown in Fig. 12 except that instead of forming an outwardly projecting flange on the upper edge of the extra sealing member 51, this member extends to the upper edge of the connecting angle member 11 and is turned back over the upper edge of the leg 16 as shown at 52 similar to the form shown in Fig. 5. In this form the lower end of the upper section is turned back at 46, as shown in Fig. 12, and the lower end 53 of the member 51 projects down within this turned back flange 46, thus effectually sealing the joint.

The joint between the angle iron rings 5 and 10 can be sealed in any of the ways shown, as for instance by a channel ring 20 as shown in Fig. 4 and by lead packing washers 45 on the connecting bolts 25 between the opposed flanges of the angle iron rings.

Several of the forms of joints shown and described herein are not specifically claimed, such being described and claimed in my co-pending divisional application filed July 15, 1931, Serial No. 550,980.

As many modifications of my invention other than those shown will readily suggest themselves to those skilled in the art, I do not limit or confine my invention to the specific details of structure herein shown and described.

I claim:

1. In a fire escape made up of tubular sections, a connection for two sections, comprising opposed angle iron rings secured upon the outer surfaces of the two adjacent ends of two sections, the end of the upper section projecting beyond its angle iron connector and adapted to enter and fit in the adjacent end of the next lower section; a water shedding sheet metal part secured beneath the angle iron member of the upper section and turned over the upper edge of same and sealed to the upper tubular section above its lower end to prevent water entering between same, and means for securing the opposed angle iron connecting rings together.

2. In a fire escape made up of tubular sections, a connection for two sections, comprising opposed angle member rings secured upon the outer surfaces of the two adjacent ends of two sections, the end of the upper section projecting beyond its angle iron connector and adapted to enter and fit in the adjacent end of the next lower section, the lower end of the upper section turned back upon itself to provide a water shedding part adapted to be formed outwardly to prevent water running down the outer surface of the tube entering between the tube and the angle member secured to the upper section.

3. In a tubular structure of the kind described, means for shedding water past a joint between two members and comprising a water shedding sheet metal part on the lower end of a section and having an upper edge portion spaced from said section and projecting downwardly, an angle iron connecting ring having one leg mounted on said section and projecting up beneath said downwardly projecting edge portion of the water shedding part, an opposed angle iron mounted on the upper end of the next adjacent lower section, means for securing the angle iron members together and means for covering the joint between the two angle irons.

4. In a sectional tubular structure of the kind described adapted to be set in a vertical or inclined position, a connection for two sections, comprising a lower end of an upper section adapted to telescope into the opposed end of the next lower section, a connecting member secured upon the outer surface of the lower end of the upper section having a flange in contact with the outer surface thereof and extending away from said end, a sheet metal part circumferentially sealed to the outer surface of said lower end and having a circumferential edge portion free of said section, and said free edge portion of said part formed outwardly around the adjacent edge of said flange.

5. In a fire escape made up of tubular sections, a connection for two sections comprising opposed angle iron rings secured upon the outer surfaces of the two adjacent ends of two sections, the end of the upper section projecting beyond its angle iron connector and adapted to enter and fit in the adjacent end of the next lower section, a water shedding sheet metal part circumferentially sealed to the outer surface of the lower end of said upper section and formed outwardly around the adjacent edge of the angle iron ring secured to the upper section, and means for connecting the two angle iron connecting rings together.

6. In a structure of the kind described, means for making a joint between two tubular sections which will shed water in one direction, the upper section having an end telescoping within the lower section, a sheet metal water shedding part sealed to the outer surface of the upper section adjacent to its lower end and having a free edge portion projecting downwardly and in spaced relation to the outer surface of said section, and a connecting member having an upwardly extending circumferential edge portion projecting up beneath said downwardly projecting edge portion.

7. In a tubular fire escape adapted to be arranged in an inclined position and made up of tubular sections, a connection for two sections, comprising opposed angle member rings secured upon the outer surfaces of the two adjacent ends of two sections, the end of the upper section projecting beyond its angle iron connector and adapted to enter and fit in the adjacent end of the next lower section, the lower end of the upper section turned back upon itself to provide a water shedding part adapted to be formed outwardly to prevent water running down the outer surface of the tube entering between the tube and the angle member secured to the upper section, and means for preventing water entering between the upper portions of the angle member rings.

In testimony whereof, I have hereunto set my hand, this 24th day of December, 1927.

RICHARD NASON FRIEND.